(12) United States Patent
Chang

(10) Patent No.: US 9,756,046 B2
(45) Date of Patent: Sep. 5, 2017

(54) NETWORK SYSTEM AND COMMUNICATION DEVICE THEREIN

(71) Applicant: DELTA NETWORKS, INC., Taoyuan County (TW)

(72) Inventor: Shu-Li Chang, Taoyuan County (TW)

(73) Assignee: DELTA NETWORKS, INC. (TW)

( * ) Notice: Subject to any disclaimer, the term of this patent is extended or adjusted under 35 U.S.C. 154(b) by 68 days.

(21) Appl. No.: 14/322,359

(22) Filed: Jul. 2, 2014

(65) Prior Publication Data
US 2015/0256538 A1 Sep. 10, 2015

(30) Foreign Application Priority Data
Mar. 6, 2014 (TW) .............................. 103107563 A

(51) Int. Cl.
*G06F 17/30* (2006.01)
*H04W 4/00* (2009.01)
(Continued)

(52) U.S. Cl.
CPC ......... *H04L 63/0876* (2013.01); *H04W 4/008* (2013.01); *H04W 12/06* (2013.01); *H04W 12/12* (2013.01)

(58) Field of Classification Search
CPC .................................. H04W 12/06; H04L 9/30
(Continued)

(56) References Cited

U.S. PATENT DOCUMENTS

2008/0056261 A1* 3/2008 Osborn ............... H04L 12/2834
370/392
2009/0177889 A1* 7/2009 Sung ..................... H04L 63/061
713/171
(Continued)

FOREIGN PATENT DOCUMENTS

CN 101197703 6/2008
CN WO 2008067764 A1 * 6/2008 ............. H04L 12/24
(Continued)

OTHER PUBLICATIONS

Baronti et al. Wireless sensor networks: A survey on the state of the art and the 802.15.4 and ZigBee standards. Dec. 29, 2006. ScienceDirect. pp. 1655-1695.*
(Continued)

*Primary Examiner* — Dede Zecher
*Assistant Examiner* — Abdullah Almamun
(74) *Attorney, Agent, or Firm* — Hauptman Ham, LLP

(57) ABSTRACT

A network system includes first nodes and a second node. Each first node is directly communicatively connected to the second node, or each first node is indirectly communicatively connected to the second node through another first node. The second node includes a network layer and an application layer. When a new node desires is joining the first nodes, the network layer sends an update signal including first network address information of the new node. The application layer is configured to connect to a database and perform an authentication on the first network address information of the new node based on a node list in the database. When the new node passes the authentication, the application layer stores the update signal in the database.

13 Claims, 4 Drawing Sheets

100A

(51) Int. Cl.
*H04L 29/06* (2006.01)
*H04W 12/06* (2009.01)
*H04W 12/12* (2009.01)

(58) Field of Classification Search
USPC .................................................... 726/4
See application file for complete search history.

(56) References Cited

U.S. PATENT DOCUMENTS

| | | | | | |
|---|---|---|---|---|---|
| 2010/0284337 | A1* | 11/2010 | Luft | ................ | H04W 84/18 370/328 |
| 2011/0029778 | A1* | 2/2011 | Garcia Morchon | .... | H04L 9/083 713/171 |
| 2011/0294431 | A1* | 12/2011 | Erdmann | ............ | H04W 40/246 455/41.2 |
| 2012/0099579 | A1* | 4/2012 | Kim | ................ | H04W 4/18 370/338 |
| 2012/0124367 | A1* | 5/2012 | Ota | ................ | H04W 12/04 713/153 |
| 2012/0124373 | A1* | 5/2012 | Dangoor | ............ | H04L 63/062 713/168 |
| 2012/0195431 | A1* | 8/2012 | Garcia Morchon | .. | H04W 12/04 380/270 |
| 2012/0299509 | A1* | 11/2012 | Lee | ................ | H04L 41/0806 315/291 |
| 2013/0191635 | A1* | 7/2013 | Oba | ................ | H04L 9/088 713/168 |
| 2013/0283033 | A1* | 10/2013 | Ahuja | ................ | H04L 9/3213 713/150 |
| 2013/0344811 | A1* | 12/2013 | Tolhuizen | ............ | H04L 12/2818 455/41.2 |
| 2014/0282945 | A1* | 9/2014 | Smith | ................ | G06F 21/32 726/6 |

FOREIGN PATENT DOCUMENTS

| | | |
|---|---|---|
| CN | 101094056 | 5/2011 |
| CN | 102761941 | 10/2012 |
| TW | 200814666 | 3/2008 |
| TW | 201023562 | 6/2010 |
| TW | 201106760 | 2/2011 |

OTHER PUBLICATIONS

ZibBee Alliance. ZigBee Specification. Jan. 17, 2008.ZigBee Standards Organization. pp. 434-460.*

* cited by examiner

NETWORK SYSTEM AND COMMUNICATION DEVICE THEREIN

RELATED APPLICATIONS

This application claims priority to Taiwan Patent Application Serial Number 103107563, filed Mar. 6, 2014, which is herein incorporated by reference.

BACKGROUND

Field of Invention

The invention relates to a network system, and more particularly, to a network system with a database for storing network address information of a node that passes authentication.

Description of Related Art

In recent years, with the maturation of network technology, the applications of network systems have become more popular, and connection technologies in network systems are further improved. For the IEEE 802.15.4 standard, the network architecture includes a physical layer (PHY layer) and a media access control layer (MAC layer). The physical layer is mainly utilized for transmitting and receiving data and selecting channels, whereas the MAC layer is utilized for generating network beacons and synchronous beacons. Generally, many network architectures adopt the IEEE 802.15.4 protocol stack, and the ZigBee is an interconnect network system based on the IEEE 802.15.4 protocol stack.

In an interconnection network system, nodes may use a tree topology, a star topology and/or a ring topology to form a communication network in which a network location database is generally required for managing a network address registered by each node, so as to transmit/forward data packets to a correct destination node. Thus, how to form and maintain a correct and absolute network location database is an important key factor.

SUMMARY

The invention is directed to providing a network system and a communication device disposed therein. The network system includes a database for storing network address information of a node passing authentication, so as to avoid the condition that the node cannot join the network system successfully due to inadequate storage space in a network layer of a trust center in the network system.

An aspect of the invention relates to a network system. The network system includes first nodes and a second node. Each of the first nodes is directly connected to the second node, or is indirectly connected to the second node through another first node. The second node includes a network layer and an application layer. When a new node is joining the first nodes, the network layer sends an update signal which includes first network address information of the new node. The application layer is configured to be connected to a database and perform authentication on the first network address information of the new node based on a node list in the database. When the new node passes the authentication, the application layer stores the update signal into the database.

In one embodiment of the invention, the second node is a trust center or a coordinator node in the network system.

In one embodiment of the invention, the node list includes sets of legal node information. The application layer compares the first network address information of the new node with the sets of legal node information, and, if the first network address information matches with anyone of the sets of legal node information, the new node passes the authentication.

In one embodiment of the invention, the node list includes sets of illegal node information. The application layer compares the first network address information of the new node with the sets of illegal node information, and, if the first network address information does not match with anyone of the sets of illegal node information, the new node passes the authentication.

In one embodiment of the invention, the first network address information includes a first media access control (MAC) address and a first network address.

In one embodiment of the invention, when the new node is directly connected to the second node and passes the authentication, the network layer sends a key packet to the new node based on the database.

In one embodiment of the invention, when the new node is indirectly connected to the second node through at least one of the first nodes as a parent node, the update signal further includes second network address information of the parent node.

In one embodiment of the invention, the second network address information includes a second MAC address and a second network address.

In one embodiment of the invention, the database is arranged in the application layer.

In one embodiment of the invention, the database is a storage device arranged external to the second node.

Another aspect of the invention relates to a communication device arranged in a network system. The network system has nodes each of which is connected to the communication device respectively. The communication device includes a network layer and an application layer. When a new node is joining the nodes, the network layer sends an update signal which includes first network address information of the new node. The application layer is configured to be connected to a database and perform authentication on the first network address information of the new node based on a node list in the database. When the new node passes the authentication, the application layer stores the update signal in the database.

In one embodiment of the invention, the node list includes sets of legal node information. The application layer compares the first network address information of the new node with the sets of legal node information, and, if the first network address information matches with anyone of the sets of legal node information, the new node passes the authentication.

In one embodiment of the invention, the node list includes sets of illegal node information. The application layer compares the first network address information of the new node with the sets of illegal node information, and, if the first network address information does not match with anyone of the sets of illegal node information, the new node passes the authentication.

In one embodiment of the invention, the first network address information includes a MAC address and a first network address.

In one embodiment of the invention, when the new node is directly connected to the communication device and passes the authentication, the network layer sends a key packet to the new node based on the database.

In one embodiment of the invention, when the new node is indirectly connected to the communication device through at least one of the nodes as a parent node, the update signal further includes second network address information of the parent node.

In one embodiment of the invention, the second network address information includes a second MAC address and a second network address.

In one embodiment of the invention, the database is arranged in the application layer.

In one embodiment of the invention, the database is a storage device arranged external to the communication device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
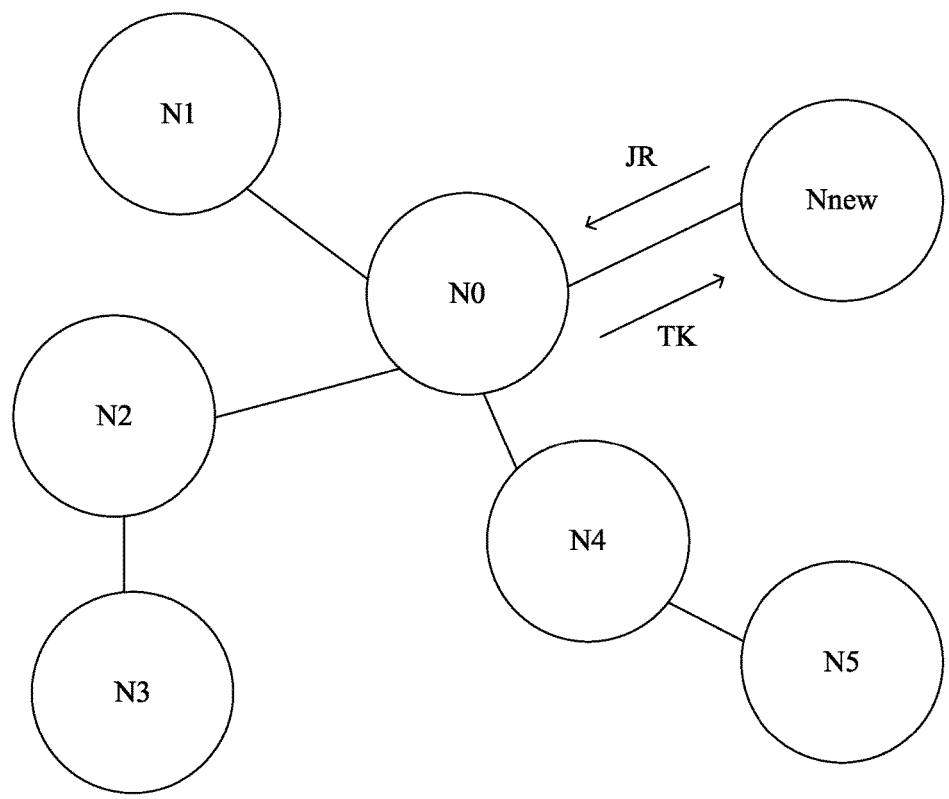
FIG. 1 illustrates a schematic diagram showing a new node joining a network system to one embodiment of the invention.

In the following description, specific details are presented to provide a thorough understanding of the embodiments of the invention. Persons of ordinary skill in the relevant art will recognize, however, that the invention can be practiced without one or more of the specific details, or in combination with other components. Well-known implementations or operations are not shown or described in detail to avoid obscuring aspects of various embodiments of the invention.

The terms used in this specification generally have their ordinary meanings in the art and in the specific context where each term is used. The use of examples anywhere in this specification, including examples of any terms discussed herein, is illustrative only, and is not meant to limit the scope and meaning of the invention or of any exemplified term. Likewise, the invention is not limited to various embodiments given in this specification.

It will be understood that, although the terms "first" and "second" may be used herein to describe various elements, components, regions, layers and/or sections, these elements, components, regions, layers and/or sections should not be limited by these terms. These terms are only used to distinguish one element, component, region, layer or section from another.

As used herein, the terms "comprising", "including", "having", and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "connected", along with their derivatives, may be used. In particular embodiments, "connected" may be used to indicate that two or more elements are in direct physical, electrical, or communicative contact with each other, or may also mean that two or more elements may not be in direct contact with each other.

In one embodiment of an interconnect network system such as ZigBee network system, a physical layer, a media access control (MAC) layer, a network layer and an application layer are included therein. When a new device is joining the network system through a parent node, the network layer stores the MAC address and the network address of the new device, and sends the above addresses to the application layer for authentication, and if the new device passes the authentication, a key is sent to the parent node through the network layer, and then the parent node forwards the key to the new device.

However, when multiple new devices are joining the network system, the network layer stores the addresses of the above multiple new devices. At this time, if the storage space is inadequate in the network layer, the addressed of some new devices might be unable to be stored in the network layer normally, and thus the above new device, which desires to join the network system through the above parent node with unsaved addresses, fails to join the network system due to unable to receive key successfully.

FIG. 1 is a diagram illustrating that a new node Nnew joins a network system 100*a* according to one embodiment of the invention. As shown in FIG. 1, the network system 100*a* includes nodes N0, N1, N2, . . . , N5. In the example shown in FIG. 1, each node N0-N5 is a communication device such as a mobile phone, a personal computer, a tablet computer, a smart controller, a network sensor, a smart appliance with communication capability or another communication unit with network communication capability. In the embodiment of the network system 100*a*, the node N0 is assigned as a trust center or a coordinator node, and is configured to coordinate/ensure the validity of communication links between nodes and issue cipher keys. In the example shown in FIG. 1, a schematic diagram in which the new node Nnew requests direct connection to the node N0 is illustrated.

When the new node Nnew is connected to the node N0 for joining the network system 100*a*, the new node Nnew sends a join request JR to the node N0, such that the node N0 acquires network address information (i.e. a media access control (MAC) address and a network address (short address)) of the new node N0, and thus the node N0 determines whether the new node Nnew is a legal node based on the network address information of the new node Nnew.

If the new node Nnew is determined to be a legal node, the node N0 send a key packet TK to the new node Nnew, such that the new node Nnew may join the network system 100*a*. If the new node Nnew is determined to be an illegal node, the node N0 does not send the key packet TK to the new node Nnew, resulting in that the new node Nnew fails to join the network system 100*a*.

It should be noted that, the aforementioned MAC address in the network address information is the information used for specifying a network device on the Internet. Generally, on the Internet, the MAC address of every network device is unduplicated and unique. That is, different network devices have different MAC addresses. On the other hand, the aforementioned short address in the network address information is the information used for specifying a network device of a network system on the Internet. Generally, the short addresses of the network devices may be duplicated on the Internet but are unique in the respective network systems. Compared to an example of each individual's personal information, the MAC addresses may be like the identification numbers in the example, and the short addresses may be like the nicknames in the example.

In addition, although the invention discloses that the communication device determines whether the new node is a legal node based on the MAC address and the short address of the new node, those skilled in the art will appreciate that other information (e.g. device identification code) of the node may be selected to perform authentication on the node in accordance with various demands, and thus embodiments of the invention are not limited thereto.

Figure 2:
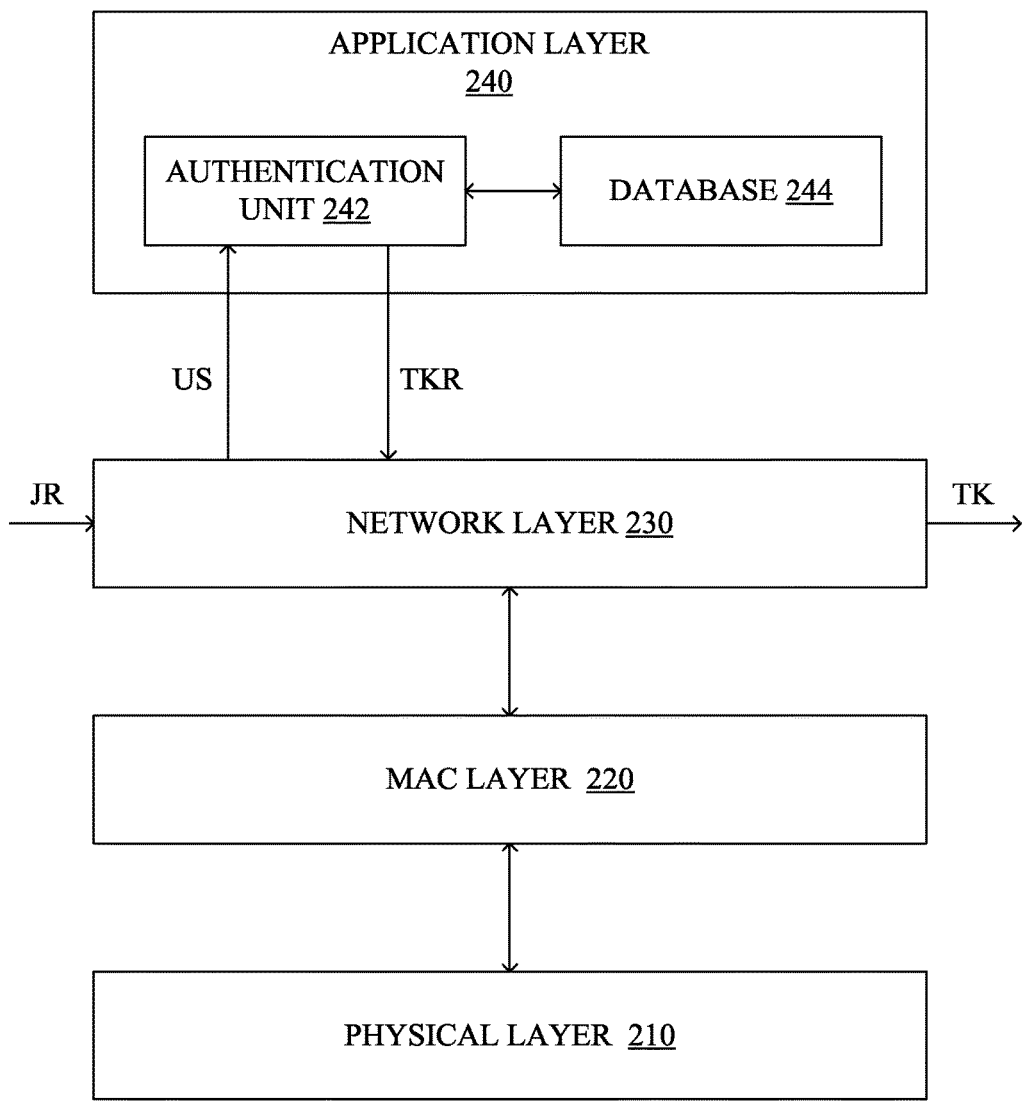
FIG. 2 illustrates a block diagram showing a communication device according to one embodiment of the invention.

FIG. 2 illustrates a block diagram of a communication device (for example, the node N0 in FIG. 1) according to the invention. As shown in FIG. 2, the node N0 adopting an IEEE 802.15.4 protocol stack includes a physical layer 210, a MAC layer 220, a network layer 230 and an application layer 240. The physical layer and the MAC layer are lower layers adopting the IEEE 802.15.4 standard, and are configured to provide channels required for transmitting information and generate beacons. In one embodiment, the transmission between the node N0 and another node are conducted through the transmission channel between their physical layers.

The network layer 230 is a layer above the MAC layer 220 for receiving the join request JR of the new node and transmitting the key packet TK to the network node of the network system. The application layer 240 is a layer above the network layer 230, and includes an authentication unit 242 and a database 244. The authentication unit 242 determines whether the new node is a legal node based on the database 244. The determination mechanism of the authentication unit 242 is explained in the below.

At first, the authentication unit 242 receives an update message US from the network layer 230, and then, the authentication unit 242 compares the update message US based on the node list stored in the database 244. In one embodiment, the node list includes sets of legal node information. If the update message US matches with anyone of the sets of legal node information, the new node passes the authentication successfully. On the contrary, if the update message US does not match with anyone of the sets of legal node information, the new node fails to pass the authentication.

In another embodiment, the node list includes sets of illegal node information. If the update message US does not match with anyone of the sets of illegal node information, the new node passes the authentication. On the contrary, if the update message US matches with anyone of the sets of illegal node information, the new node fails to pass the authentication.

It should be noted that, the disclosure only illustrates that the authentication unit performs authentication based on the sets of legal/illegal node information, and, those skilled in the art shall be able to select another authentication method according to various demands, and is not limited to the aforementioned.

For clear and convenient description, the following embodiment is described accompanying with FIG. 1 and FIG. 2. When the new node Nnew is directly connected to the node N0, the new node Nnew sends a join request JR, and the join request JR arrives at the network layer 230 of the node N0 through the physical layer 210 and the network layer 220 of the node N0. At this time, the network layer 230 sends an update message US including the MAC address and the short address of the new node N0 to the authentication unit 242 of the application layer 240. Thereafter, the authentication unit 242 performs authentication on the update message US based on the node list stored in the database 244. When the new node Nnew passes the authentication (i.e. the new node Nnew is determined as a legal node), the application layer 240 stores the MAC address and the short address of the new node Nnew into the database 244, and sends a key request TKR to the network layer 230 by the authentication unit 242, such that the network layer 230 of the node N0 sends a key packet TK to the new node Nnew through the network layer 220 and the physical layer 210 of the node N0, thereby enabling the new node Nnew to join the network system 100a successfully.

When the new node Nnew fails to pass the authentication (i.e. the new node Nnew is determined as an illegal node), the application layer 240 neither stores the update message US, nor sends a key request TKR to the network layer 230, such that the new node fails to receive a key packet TK from the network layer 230 and cannot join the network system 100a.

Figure 3:
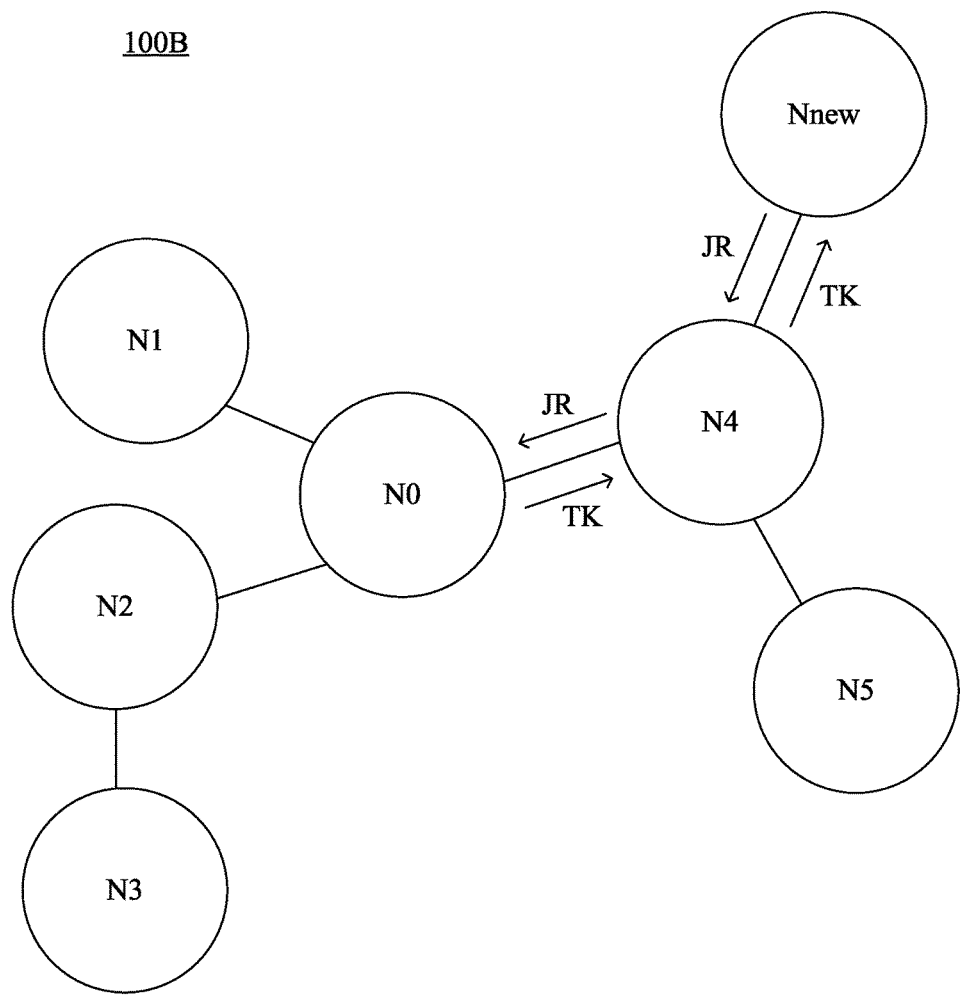
FIG. 3 illustrates a schematic diagram showing a new node joining a network system according to one embodiment of the invention.

FIG. 3 is a diagram illustrating that a new node Nnew joins a network system 100b according to one embodiment of the invention. As shown in FIG. 3, the network system 100b includes nodes N0, N1, N2, . . . , and N5.

In the example shown in FIG. 3, each of the nodes N0-N5 is a communication device. In the embodiment of the network system 100b, the node N0 is assigned as a trust center or a coordinator node, and is configured to coordinate/ensure the validity of communication links between nodes and issue cipher keys. In the example shown in FIG. 3, a diagram in which the new node Nnew requests an indirect connection to the node N0 is illustrated.

For clear and convenient description, the following embodiment is described accompanying with FIG. 2 and FIG. 3. When the new node Nnew is indirectly connected to the node N0 (as a trust center or a coordinator node in this example) through the node N4 for joining the network system 100b, the node N4 is regarded as a parent node, and the new node Nnew sends a join request JR to the network layer 230 of the node N0 through the parent node. At this time, the network layer 230 sends an update message US including the MAC address and the short address of the new node N0 and the MAC address of the parent node to the authentication unit 242 of the application layer 240. Then, the authentication unit 242 performs authentication on the update message US based on the node list stored in the database 244. When the new node Nnew passes the authentication (i.e., the new node Nnew is determined as a legal node), the application layer 240 stores the MAC address and the short address of the new node Nnew into the database 244 and looks up the network address of the parent node stored in the database 244, and arranges the MAC address and the network address of the new node Nnew and the parent node into the standard format of the command sent by the application layer 240. Then, the authentication unit 242 sends a key request TKR including the MAC addresses and the network addresses of the new node Nnew and the parent node to the network layer 230 by the APSME-transport-key.request command, such that the network layer 230 sends a key packet TK to the parent node by the NLDE-data.request message without looking up the network address of the parent node, and then the parent node forwards the key packet TK to the new node Nnew, thereby enabling the new node Nnew to join the network system 100b successfully.

When the new node Nnew fails to pass the authentication (i.e., the new node Nnew is determined as an illegal node), the application layer 240 neither stores the MAC address and the network address of the new node Nnew, nor sends a key request TKR to the network layer 230, such that the new node fails to receive a key packet TK from the parent node for joining the network system 100b.

It should be noted that, in the ZigBee network system, the role of the network device can be categorized into a coordinator for starting a network, a router for allowing other devices to join and an end device without need of maintaining network architecture. In the aforementioned embodiment, the node N0 is a coordinator in the network system 100b, the parent node is a router, and the new node Nnew can be a router or a terminal device.

In the aforementioned embodiment, in each node (e.g. node N0 in FIG. 2), the database 244 for storing the network address information which passes the authentication is arranged in the application layer 240 internal to the node N0, but the disclosure is not limited thereto.

Figure 4:
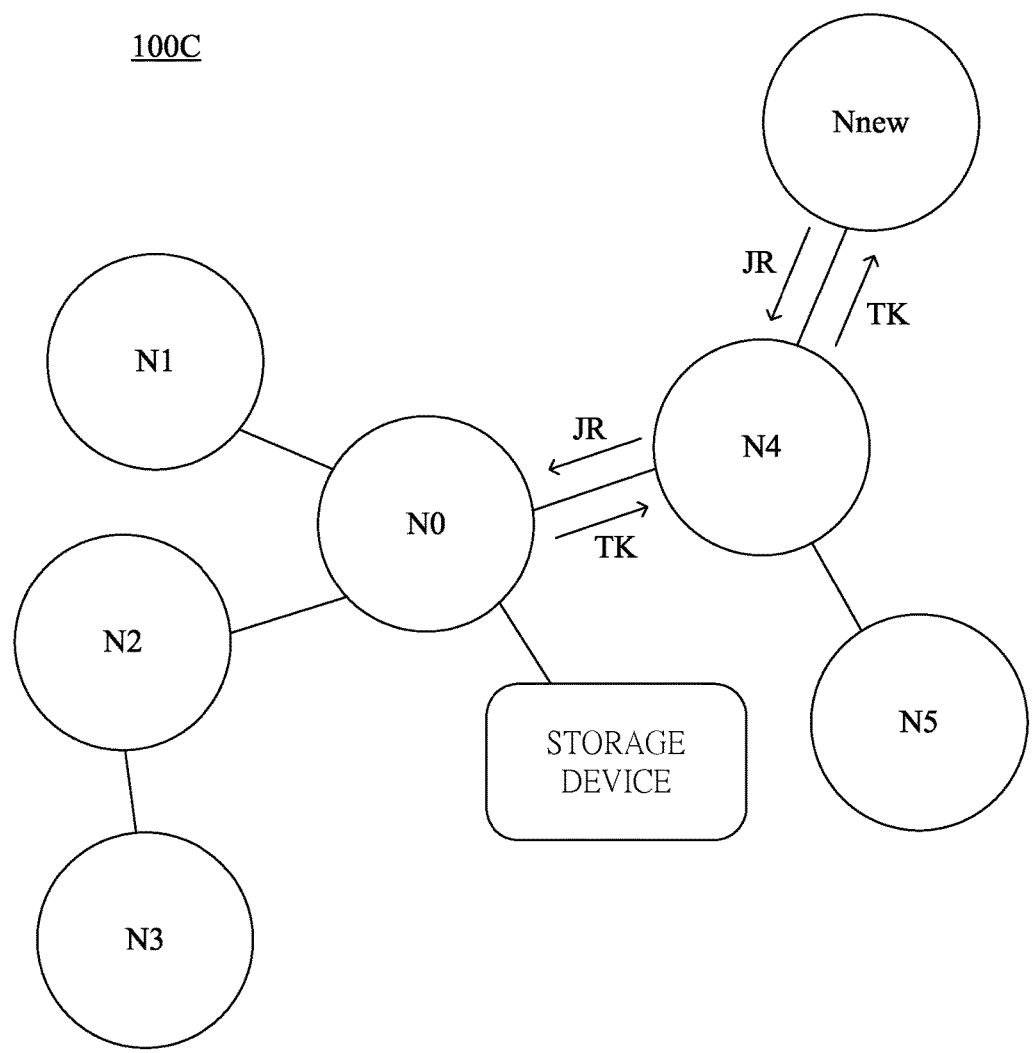
FIG. 4 illustrates a schematic diagram showing a storage device arranged external to a communication device according to one embodiment of the invention.

FIG. 4 is a diagram illustrating that a storage device is arranged external to a communication device according to one embodiment of the invention. As shown in FIG. 4, the network system 100c includes nodes N0, N1, N2, . . . , N5. In the example of FIG. 4, each node N0-N5 is respectively a communication device.

When a new node Nnew is indirectly connected to the node N0 (as a trust center or a coordinator node in this example) through the node N4 for joining the network system 100c, the operation between the node N0 and the new node Nnew is similar to that of the embodiment illustrated in FIG. 3, and thus is not described herein again.

It should be noted that, in the embodiment, the database 244 for storing the network address information which passes the authentication is arranged external to the node N0, and is established in a storing device Nst connected with the node NO. In addition, the database 244 can utilize all types of the storage device Nst to realize. For example, the storage device Nst can be a random access memory (RAM) which utilizes electricity mechanism to store information, or a hard disk drive for storing information by utilizing magnetic energy mechanism.

Summing the above, the communication device of the invention stores the network address information of the node by the database which only stores the network address information of the node passing the authentication, and does not over-consume the limited spaces for storing in the database. Even if in a complicated network environment (i.e. with large numbers of the network groups and the network devices), the communication device of the invention can still determine if the new node is a legal node and send a key packet to the legal node, such that the legal node joins the network successfully, and the interactions which degrade connection efficiency between network groups and network devices efficiently reduced.

In addition, although the invention use the database to store the network address information of the new node and look up the network address information of the parent node, the commands of the key request sent by the application layer and the key packet sent by the network layer are all standard commands of the ZigBee network, and therefore does not generate additional computation in the network system.

Further, in the invention, the arranged location of the database and the storage spaces can be flexibly designed, such that the user may determine the location and capacity of the database according to practical demands. For example, if the network devices are many, the database with larger capacity is arranged outside of the communication device. Further, the database of the invention stores the network address information of the node passing the authentication, which benefits the user to control the network.

Although the invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A network system, comprising:
   a plurality of first nodes; and
   a second node, wherein the first nodes are directly communicatively connected to the second node, or each of the first nodes is indirectly communicatively connected to the second node through another first node, wherein the second node is a communication device comprising:
   a network layer, wherein the network layer receives a join request from a new node when the new node is joining the first nodes, and the network layer sends an update signal including network address information of the new node, and wherein when the new node is indirectly connected to the second node through at least one of the first nodes as a parent node for joining the first nodes, and the update signal further includes a media access control (MAC) address of the parent node; and
   an application layer configured to connect to a database, the application layer performing an authentication on the network address information of the new node based on a node list in the database,
   wherein when the new node is indirectly communicatively connected to the second node through the parent node and passes the authentication, the application layer stores the network address information of the new node into the database, looks up a network address of the parent node stored in the database, and then sends a key request having the network address information of the new node and the network address and the MAC address of the parent node to the network layer, and then the network layer generates and sends a key packet to the new node through the parent node accordingly without looking up the network address of the parent node.

2. The network system of claim 1, wherein the second node is a trust center or a coordinator node in the network system.

3. The network system of claim 1, wherein the node list comprises a plurality of sets of legal node information, and the application layer compares the network address information of the new node with the sets of legal node information, and, if the network address information of the new node matches with anyone of the sets of legal node information, the new node passes the authentication.

4. The network system of claim 1, wherein the node list comprises a plurality of sets of illegal node information, and the application layer compares the network address information of the new node with the sets of illegal node information, and, if the network address information of the new node does not match with anyone of the sets of illegal node information, the new node passes the authentication.

5. The network system of claim 1, wherein the network address information of the new node comprises a MAC address and a network address of the new node.

6. The network system of claim 1, wherein the database is arranged in the application layer.

7. The network system of claim 1, wherein the database is a storage device arranged external to the second node.

8. A communication device arranged in a network system having a plurality of nodes, wherein each of the nodes is communicatively connected to the communication device respectively, and, wherein the communication device comprises:
- a network layer, wherein the network layer receives a join request from a new node when the new node is joining the first nodes, and the network layer sends an update signal including network address information of the new node, and wherein when the new node is indirectly connected to the communication device through at least one of the nodes as a parent node for joining the nodes, and the update signal further includes a media access control (MAC) address of the parent node; and
- an application layer configured to connect to a database, the application layer performing an authentication on the network address information of the new node based on a node list in the database,
- wherein, when the new node is indirectly communicatively connected to the communication device through the parent node and passes the authentication, the application layer stores the network address information of the new node into the database, looks up a network address of the parent node stored in the database and then sends a key request having the network address information of the new node and the network address and the MAC address of the parent node to the network layer, and then the network layer generates and sends a key packet to the new node through the parent node accordingly without looking up the network address of the parent node.

9. The communication device of claim 8, wherein the node list comprises a plurality of sets of legal node information, and the application layer compares the network address information of the new node with the sets of legal node information, and, if the network address information of the new node matches with anyone of the sets of legal node information, the new node passes the authentication.

10. The communication device of claim 8, wherein the node list comprises a plurality of sets of illegal node information, and the application layer compares the network address information of the new node with the sets of illegal node information, and, if the network address information of the new node does not match with anyone of the sets of illegal node information, the new node passes the authentication.

11. The communication device of claim 8, wherein the network address information of the new node comprises a MAC address and a network address of the new node.

12. The communication device of claim 8, wherein the database is arranged in the application layer.

13. The communication device of claim 8, wherein the database is a storage device arranged external to the communication device.

* * * * *